March 25, 1952 J. C. KOONZ ET AL 2,590,419
PRESSURE SWITCH
Filed July 16, 1948 2 SHEETS—SHEET 1
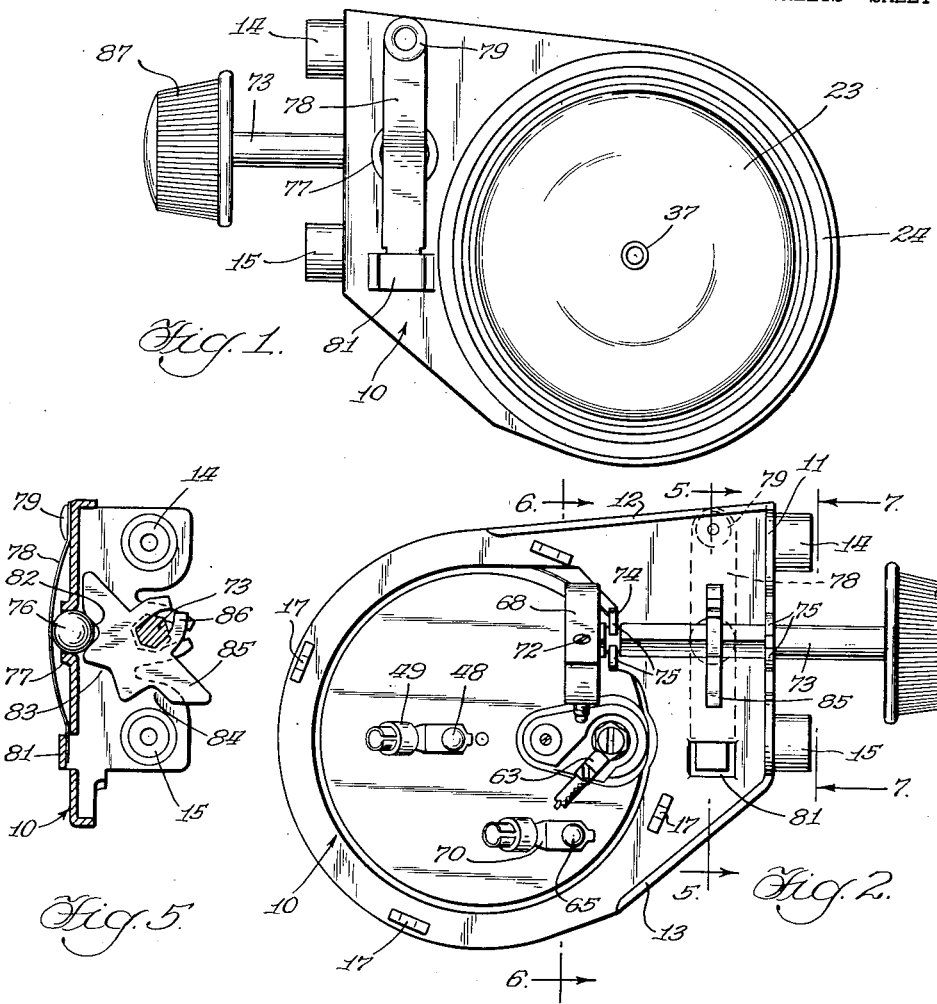
INVENTORS.
John C. Koonz and
Chester L. Piper
BY Clarence J. Loftus
Atty March 25, 1952 — J. C. KOONZ ET AL — 2,590,419
PRESSURE SWITCH
Filed July 16, 1948 — 2 SHEETS—SHEET 2

INVENTORS.
John C. Koonz and
Chester L. Piper
By Clarence J. Loftus
Atty.

Patented Mar. 25, 1952

2,590,419

UNITED STATES PATENT OFFICE 2,590,419

PRESSURE SWITCH

John C. Koonz, Fort Wayne, and Chester L. Piper, New Haven, Ind., assignors to The Magnavox Company, Fort Wayne, Ind., a corporation of Delaware Application July 16, 1948, Serial No. 39,024

5 Claims. (Cl. 200—83)

The present invention relates to pressure switches, and this disclosure is a continuation in part of our earlier applications, Serial Numbers 718,542, now abandoned; 721,220, now Patent No. 2,502,326, dated March 28, 1950; 766,936; and 779,060, now abandoned, filed December 26, 1946, January 10, 1947, August 7, 1947, and October 10, 1947, respectively.

The inventive principles of the switch illustrated and described herein may be adapted to many and varied uses, but the invention shown is the specific form designed for the purpose of effecting automatic control of the water level in an automatic domestic washing machine. In this connection it may be mentioned that the shortcomings of controls such as float valves, for example, which require the working parts to be immersed in the washing fluid, have been recognized for many years, yet there has never been introduced to the industry a pressure-actuated device that would successfully accomplish the desired results.

It is believed that the reasons for this condition arise directly from the fact that the several functional characteristics of a switch capable of satisfactory operation in this environment are not only extremely exacting, but have heretofore been incompatible and conflicting; with the result that no structure has heretofore been devised that is, as a practical matter, capable of accomplishing the desired results. It is accordingly believed in order to briefly point out the necessary requisites of a switch designed for this particular purpose, so that the present disclosure may be examined in the light of the various problems long unsolved by prior inventors, not only in order that the manner in which the solution is reached will be fully apparent, but also so that the significance of the structural limitations in the present claims may be examined with a full appreciation of the functional improvements that the novel combination of parts brings about. To be satisfactory for the purpose, any switch must attain the simultaneous accomplishment of several important characteristics. Specifically, it must be possessed of (1) High sensitivity; to respond to very low pressures, since the total pressure reported by the shallow depth of water in a domestic washing machine is at best only a few ounces;

(2) Selectivity; so that the switch is entirely unresponsive to surges or transient pressures resulting from rotation of the cylinder or movement of the water baffles in the machine;

(3) Uniform accuracy; so that switch will not only be actuated at the precise water level for which it is set, but also in order that its point of actuation will be exactly the same at each operation and will not vary between one cycle and the next;

(4) Positive contact actuation; so that the contacts open and close with an abrupt clean-cut movement, free from any wobbling or faltering which would otherwise cause excessive arcing on the contacts and cause chattering in the solenoid valves of the machine;

(5) Rugged simplicity; requiring no attention or service whatsoever, yet sufficiently unaffected by wear, abuse, neglect, or lack of lubrication that it is capable of maintaining satisfactory accuracy over a long period of years.

It is well known in the art that prior types of devices are incapable of dependable operation at extremely low pressure and are not constant in their pressure response, and many prior inventors have unsuccessfully tried to devise a mechanism offering a simultaneous solution to those two problems. The problem is particularly difficult in the washing machine industry, however, since to accomplish satisfactory control of the level of washing fluid in a small domestic washing machine of the automatic type it is not only essential that the pressure switch be capable of actuation by a relatively small pressure and designed to have a precise and constant shut-off point, but it is also essential that the switch be of such design and construction that it is not affected by surges or transient pressures, caused by rotation of the washing machine rotor in the tub or by splashing of the water due to the movement imparted to it by the fins or paddles of the mechanism.

The degree of precision required to produce a commercially acceptable device will be best appreciated when it is remembered that the pressure head exerted by one foot of water (at 62 degrees Fahrenheit) is 0.433 pound p. s. i. from which it follows that a switch to be capable of response to the pressure head of, say, six inches of water must respond to a total working pressure of only 0.217 pound. Moreover, it is necessary to regulate the flow of incoming water so precisely as to cause the water to shut off at the desired level with a tolerance of not more than one-eighth of an inch, plus or minus. This means that the switch contacts must function with a deviation of less than 0.0045 pound from any pre-set value since the total range of pressure within which the switch mechanism must operate is only 0.009 pound. With these facts in mind, it will easily be seen that the provision of any mechanism capable of dependable, abrupt contact actuation in response to such minute variations of pressure, yet not effected by transient pressures greatly exceeding these figures, and at the same time of sufficiently sturdy and rugged construction as to stand up in a domestic appliance, necessarily presents a very real problem.

In view of the foregoing it is not strange that, despite the known objectionable features of float valves, the industry has heretofore been forced to resort to them to regulate the water level, since no pressure-actuated devices capable of performing the necessary functions have been introduced to the industry. It is accordingly submitted that no such switch existed; and that these teachings, which result in the solution of an extremely difficult mechanical problem, represent a substantial contribution to the art and merit adequate patent protection.

It is accordingly the principal aim of the present invention to attain the simultaneous accomplishment of three important objects, namely, the provision of a pressure switch wherein the parts are so constructed and related to each other that the switch is susceptible of actuation by extremely low pressures; second, the provision of a switch capable of actuation by low pressures, yet having a constant and precise point of actuation; and third, the provision of a switch so designed as to be uninfluenced by surges or transient pressures and responsive to only sustained average pressures.

Additional objects reside in the provision of a pressure switch having the characteristics noted above, yet of simple, sturdy, trouble free design, and arranged to open and close its contacts in a sharp, positive and clear cut movement.

A present preferred embodiment of the invention is illustrated in the drawings of this specification, wherein:

Figure 1 is a front elevational view of a pressure switch, constructed in accordance with these teachings;

Figure 2 is a rear elevational view thereof;

Figure 5 is a detail sectional view taken substantially on the plane of the line 5—5 of Figure 2;

Figure 6 is a fragmental sectional view taken substantially on the plane of the line 6—6 of Figure 2; and Figure 7 is a detail section view taken on the plane of the line 7—7 of Figure 2.

Figure 3:
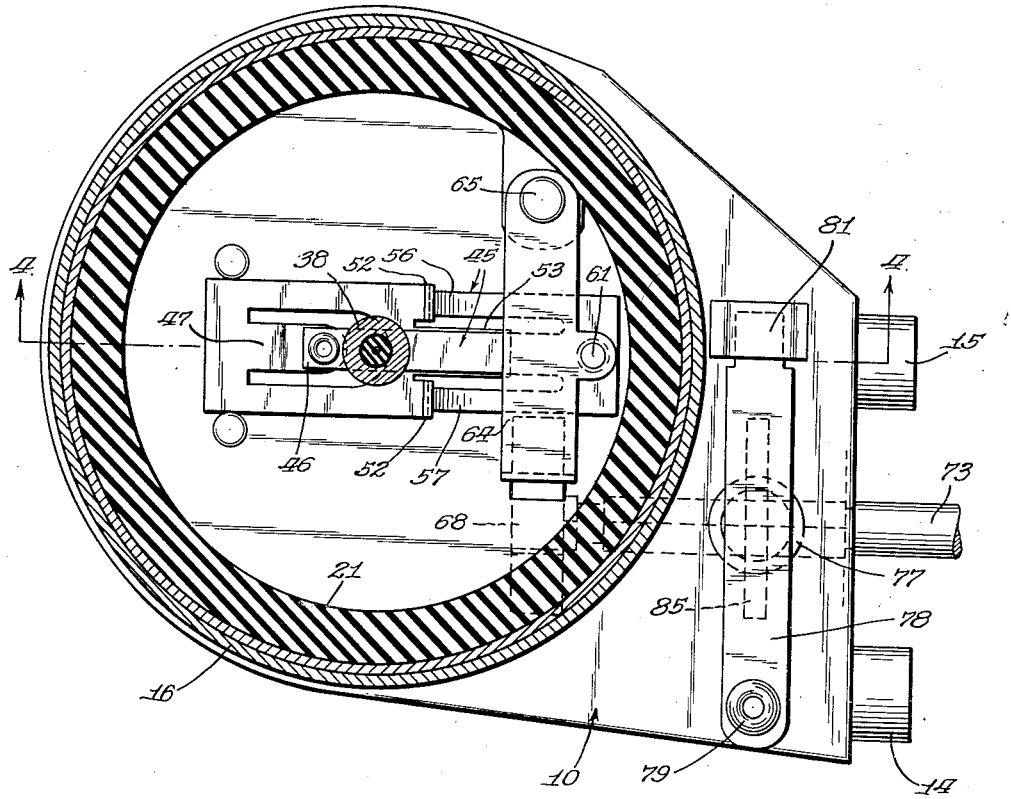
Figure 3 is a sectional view taken substantially on the plane of the line 3—3 of Figure 4.

The switch includes a frame 10 which is preferably in the form of a sheet metal stamping having a mounting flange 11 with reinforcing flanges 12 and 13. A pair of threaded mounting studs 14 and 15 are secured in the flange 11, so that the entire unit may be conveniently attached to a mounting panel.

The frame 10 carries a generally cylindrical metal housing 16, having a plurality of tabs 17 staked through apertures in the frame, so that the housing 16 surrounds and encloses the working parts of the switch. The working parts of the assembly are mounted within a molded insulating shell 18 closed by a metal baffle plate 19 clamped to the flange 21. The baffle is held in place by the rolled edge 22 of a metal cover 23, so that the cover is securely locked on the housing. The housing 16 surrounds the cover closely and includes an inwardly curled flange 24 against which the rolled edge 22 seats, so that the insulating shell and its cover may be held in the housing by any convenient means, as by soldering the rolled edge 22 to the housing 16 through spaced apertures 25.

Figure 4:
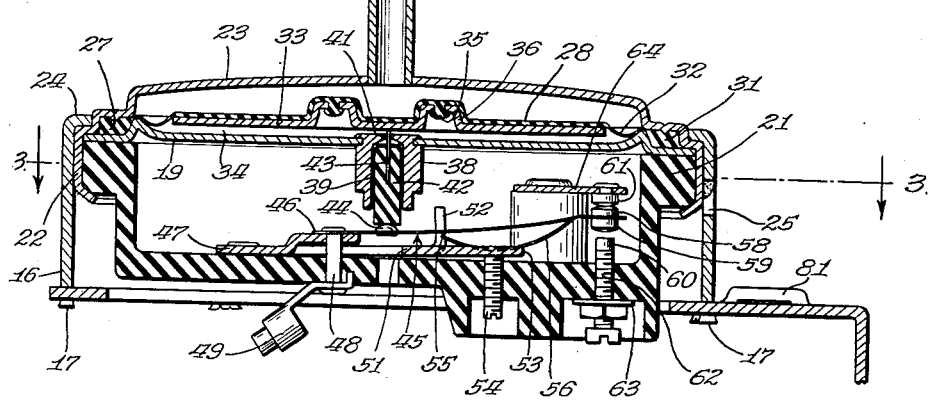
Figure 4 is a sectional view taken substantially on the plane of the line 4—4 of Figure 3.

In addition to holding the cover 23 on to the insulating shell 18, the rolled edge 22 of the cover serves to clamp the marginal edge 27 of a thin, limp, pressure sensitive membrane 26 to the marginal edges of the baffle 19. The membrane 28 is of freely yieldable, pliant material, such as thin sheet rubber, and in the preferred form of the invention it includes a circular central portion joined to the outside marginal edge 27 by a loose annular web 32 so that the membrane is freely suspended in lax position across the baffle 19. The membrane is normally supported in a position of zero initial load by a relatively thin, light, stiff pressure disc 33 so that the membrane and baffle plate 19 are spaced apart to form a shallow air chamber 34. The pressure disc may be secured to the membrane by a pair of tabs 35, formed as a part of the membrane and drawn through perforations in the raised bosses 36 of the pressure disc (Figure 4), but it is to be noted that the membrane does not necessarily carry any of the weight of the pressure disc, and that it is thus entirely in lax position so that it not only has no load characteristic of its own but also has no initial load imposed upon it.

The cover 23 is provided with a pressure inlet connection 37, so that pressure transmitted to it (as from a sump in a washing machine tub) may act upon the pressure disc 33 through the membrane 28 and thus actuate the pressure responsive switch of the device. To this end the baffle plate 19 is provided with a central sleeve 38, having a bore 39 terminating in a tiny bleeder orifice 41 adjacent the center of the pressure disc 33. A slide rod 42, which is conveniently of molded insulating material, is positioned within the bore 39, and the slide rod carries a slender needle 43 extending through the bleeder opening 41 and having its point engaging the flat surface of the pressure disc 33. The needle 43 is closely fitted within the bleeder orifice 41 so that although the needle can slide in the opening almost without friction, yet it will close the aperture sufficiently to retard the movement of air through the orifice, and allow the switch to respond to sustained pressures only, without being affected by momentary pressure surges.

The outer end of the slide rod 42 bears against a pointed rivet 44 carried on the center leaf of a cantilever type multiple section leaf spring 45. This spring has one end 46 mounted on the bracket 47 by a rivet 48 which not only secures the bracket in position but also establishes electrical contact between the spring and the terminal lug 49. The bracket 47 includes a forwardly extending portion 51 having a pair of upstanding legs 52 at its opposite sides and a forward extension 53 on which an adjusting screw 54, threaded through the insulating housing 18, is adapted to bear. The legs 52 each include a notch 55 in which the pointed ends of the side members 56 and 57 of the spring 45 may bear, and movement of the screw 54 may adjust the position of the notches 55 with respect to the center portion 45 of the spring, so that a light pressure against the pointed rivet 44 will move the center span 45 of the spring across the notches to cause the free end of the spring to snap downwardly to a position wherein the contact 59 engages the contact 60. Thus, the spring and bracket provide a snap action mechanism normally holding the contacts 58—61 in engagement but adapted to move in a quick, abrupt and positive manner to break the circuit through these contacts and close the contacts 59—60. The over-center action of this spring is comparable to the action of a toggle joint in this respect, since the two pair of contacts, in addition to performing their function of opening and closing the switch circuits, also function as limit stops to limit the movement of the bowed toggle spring. The contact 60 is carried on the inner end of a threaded adjusting screw 62 extending through the soldering terminal 63, so that the screw not only completes the electrical circuit through the switch but also comprises a shiftable mounting for the contact.

The contact 61 is shiftable in its position and is arranged to be adjusted to vary the pressure at which the switch will respond, so that the device may be set to any of several different water depths. To this end the contact 61 is mounted on a cantilever spring arm 64 secured in position by a rivet extending through the wall of the insulating shell 18 to the terminal lug 70. The unsupported end of the arm is offset to extend through an opening 66 in the back wall of the shell 18, and the arm terminates in a cam follower portion 67, positioned adjacent the rotary cam 68. The cam 68 includes a cut away portion 69 to clear the cam follower, and a pair of adjustable cam screws 71 and 72 to engage the follower.

The cam is carried on a rotatable camshaft extending between the mounting flange 11 of the switch frame and an inner bracket 74 bent upwardly from the metal of the frame 10. The bracket 74 and the flange 11 are each provided with a pair of deformable bearing tabs 75. These tabs lie in parallel position prior to assembly with the shaft, but are bent inwardly around the shaft in the assembly operation, so that the circular bearing portion of the shaft lies between a pair of V-shaped wedging surfaces. The shaft is spring urged into firm yet resilient engagement with these converging surfaces by a ball detent 76, carried in the flanged ball aperture 77 in the frame 10 and urged inwardly by a leaf spring 78. The spring is anchored to a rivet 79 at one end and has its opposite end held down by a tab 81. The ball detent 76 presses inwardly against the wedging surfaces of the notches 82, 83 or 84 of a detent plate 85, which is rigidly mounted on the camshaft 73 by a pair of deformable ears 86. Thus, when the ball 76 presses into the wedging surfaces of any one of the notches 82, 83 or 84 it will not only position the camshaft 73 in the precise angular position desired, but it will also press the bearings of the camshaft into tight engagement in the V shaped slot between the bearing tabs 75, so that the camshaft will always take precisely the same position at any one of its three locations. It follows that the positioning of the rounded heads of the screws 71 and 72 is exactly determined, with the result that the movement of the contact 61 will be without any uncontrolled variation. Thus the switch will always respond to exactly the same pressure at any one of the three possible pressure settings.

In operation, the operator of the machine will set the hand control knob 87 to any one of the three water levels desired and the operation of the machine will thereafter be automatic; that is, as soon as the water in the tub develops a pressure head equal to the desired water depth, the pressure will be transmitted through a suitable tube or conduit to the pressure inlet 37 of the valve, where it will act on the membrane 28 to exert a force pressing the pressure disc 33 against the point of the needle 43. The pressure required to move this needle depends on which of the notches 82, 83 or 84 are in engagement with the detent ball, but when the desired pressure is reached the rod 42 will move the center leaf 45 of the multiple section spring across the pivot notches 55, and will thus cause the spring to snap to its opposite position. Since the pressure at which the switch will respond during this movement is governed entirely by the position of the spring with relation to its pivots and its limit stops, it is seen that the adjustment for the lower water level may be accomplished by the manipulation of the adjusting screw 54. The cam screws 71 and 72 are thereafter adjusted to move the contact 61 back the distance necessary to modify the original adjustment sufficiently to cause the switch to act at the desired second and third alternative liquid levels.

The pressure at which the snap spring will return is entirely independent of the position of the contact 61, however, and depends solely upon the position of the opposite limit stop. Thus the pressure at which the spring will return may be separately adjusted by the manipulation of the adjusting screw 62.

From the foregoing it will be seen that the teachings of the present invention result in the successful reconciliation of several factors which have heretofore been so conflicting as to preclude their incorporation into a single device. Specifically, it is seen that the teachings of this disclosure accomplish a high degree of sensitivity in a pressure switch, without resorting to the fragile and delicate structures ordinarily found in any sensitive pressure-actuated instrument of the art. Moreover, the switch responds only to sustained pressures and is not actuated by transient pressures or surges, even though the momentary pressure of a surge may greatly exceed the average pressure to which the switch will respond.

The mechanism includes a mechanical action which is substantially frictionless and thus achieves a high degree of accuracy and uniformity of operation without the necessity of complicated or expensive parts and without resorting to devices having inherent difficulties of assembly. The operation of the contacts is entirely positive, since they move with a clean-cut snapping action and have no tendency to falter or wobble, either in their opening or closing movements. It follows that they are capable of handling relatively large current loads and have no tendency toward undue arcing and will not induce chattering into the valves which they control. The several moving parts of the device transmit motion to each other by pointed contacts only, and thus, in addition to resulting in a device having a high degree of accuracy and an unusual uniformity of operation, also results in a mechanism requiring no lubrication, yet designed to be substantially unaffected by lack of lubrication even after many years of wear.

In view of the foregoing, it is again submitted that the teachings of this disclosure accomplish an important advance in the pressure switch art and offer an entirely satisfactory solution to a problem which has long been recognized in an active industry but to which no solution has heretofore been forthcoming.

Having thus described the invention, what we claim as new and desire to protect by United States Letters Patent is:

1. In a pressure switch, in combination, a multiple section over-center leaf spring including at least one tension element and at least one compression element, with a pair of limit stops for the spring; means including a shiftable mounting for one of said limit stops and a shiftable pivot for a compression element of the spring to adjust the spring to actuation at a specified pressure; additional means to adjust the spring for return movement, said additional means consisting of a shiftable mounting for the other of the limit stops, a manually shiftable camshaft, at least one cam surface on said camshaft, and means responsive to said cam to shift said second limit stop; together with an air chamber, a freely suspended limp membrane closing one side of the air chamber; a thin, light, relatively stiff pressure disc within said air chamber and positioned to normally maintain said membrane in a position of zero initial load; a sleeve in the wall of said air chamber with a bleeder orifice adjacent the center of the pressure disc and an enlarged bore opening toward the multiple section leaf spring; an actuating rod extending into the bore of the sleeve and in single point engagement with the leaf spring, and a needle on said actuating rod extending through the bleeder orifice, with the end of the needle in engagement with the center of the pressure disc.

2. In a pressure switch, in combination, a multiple section over-center leaf spring including at least one tension element and at least one compression element, with a pair of limit stops for the spring; means to adjust the spring to actuation at a specified pressure and additional means to adjust the spring for return movement, together wtih an air chamber, a freely suspended limp membrane closing one side of the air chamber, a thin, light, relatively stiff pressure disc within said air chamber and positioned to normally maintain said membrane in a position of zero initial load; a sleeve in the wall of said air chamber with a bleeder orifice adjacent the center of the pressure disc and an enlarged bore opening toward the multiple section leaf spring; an actuating rod extending into the bore of the sleeve and in engagement with the leaf spring, and a needle on said actuating rod extending through the bleeder orifice, with the end of the needle in engagement with the center of the pressure disc.

3. In a pressure switch, in combination, a limp membrane, a relatively stiff disc at the center of said membrane, a multiple section over-center leaf spring including at least one tension element and at least one compression element; and an actuating rod extending directly between the pressure disc and the spring, said actuating rod having a pointed contact at one end bearing against the pressure disc and a pointed contact at the other end bearing against the spring; together with at least one shiftable pivot for a compression element of the spring to adjust the spring to actuation at a specified pressure, and additional means to adjust the spring for return movement; said additional means consisting of at least one shiftable limit stop for the spring, a manually shiftable camshaft, at least one cam surface on said camshaft, and means responsive to movement of said cam to alter the position of said limit stop.

4. In a pressure switch, the combination, with a pressure sensitive member and an actuating rod responsive to movement of said member, of a cantilever type multiple section over-center leaf spring including at least one tension element and at least one compression element; a pair of contacts acting as limit stops for the free ends of said spring; means including a shiftable mounting for one of said contacts and a shiftable pivot for a compression element of the spring to adjust the spring ot actuation at a specified pressure, and additional means to adjust the spring for return movement; said additional means consisting of a cantilever arm supporting the other contact and including a cam follower portion at the free end of the arm, a cam adapted to engage said cam follower to flex the arm and move said contact; a rotatable shaft carrying said cam, a pair of wedging bearings for said camshaft, and a spring pressed wedging detent on the same side of the shaft as the cam follower to index the shaft in predetermined angular orientation and urge it into wedging engagement with its bearings.

5. In a pressure switch including a cantilever type multiple section over-center leaf spring and a shiftable contact acting as a limit stop for said switch, an adjusting mechanism for said contact consisting of a cantilever arm supporting said contact near the mounting of the arm, and including a cam follower portion at the free end of the arm; a cam adapted to engage said cam follower to flex the arm and move said contact; a rotatable shaft carrying said cam, a pair of bearings for said camshaft, and a spring pressed detent on the same side of the shaft as the cam follower to index the shaft in predetermined angular orientation and urge it into firm engagement with its bearings.

JOHN C. KOONZ.
CHESTER L. PIPER.

REFERENCES CITED

The following references are of record in the file of this patent:

UNITED STATES PATENTS

| Number | Name | Date |
|---|---|---|
| 2,246,581 | Fetter | June 24, 1941 |
| 2,405,142 | Holt | Aug. 6, 1946 |
| 2,406,719 | Upson | Aug. 27, 1946 |
| 2,444,163 | Kocmich | June 29, 1948 |